(No Model.)

A. BARDELL.
TROWEL OR SCOOP.

No. 356,344. Patented Jan. 18, 1887.

WITNESSES:
Otto Hufeland
William Miller

INVENTOR
Alfred Bardell
BY
Van Santvoord & Hauff
ATTORNEYS

United States Patent Office.

ALFRED BARDELL, OF BROOKLYN, NEW YORK.

TROWEL OR SCOOP.

SPECIFICATION forming part of Letters Patent No. 356,344, dated January 18, 1887.

Application filed November 18, 1886. Serial No. 219,335. (No model.)

*To all whom it may concern:*

Be it known that I, ALFRED BARDELL, a citizen of the United States, residing at Brooklyn, in the county of Kings and State of New York, have invented new and useful Improvements in Trowels, Scoops, and Similar Articles, of which the following is a specification.

This invention relates to improvements in trowels, scoops, and similar articles, as fully set forth in the following specification and claims, and illustrated in the accompanying drawings, in which—

Figure 1:
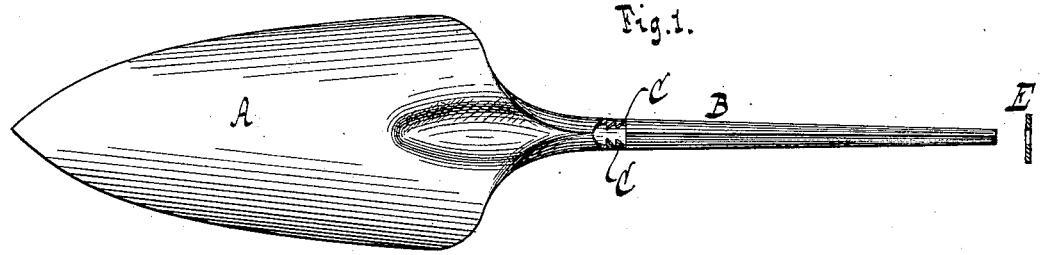
Figure 2:
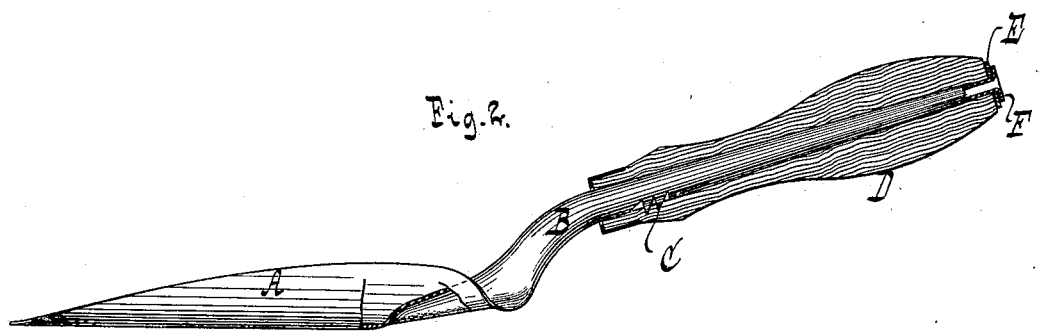
Figure 3:
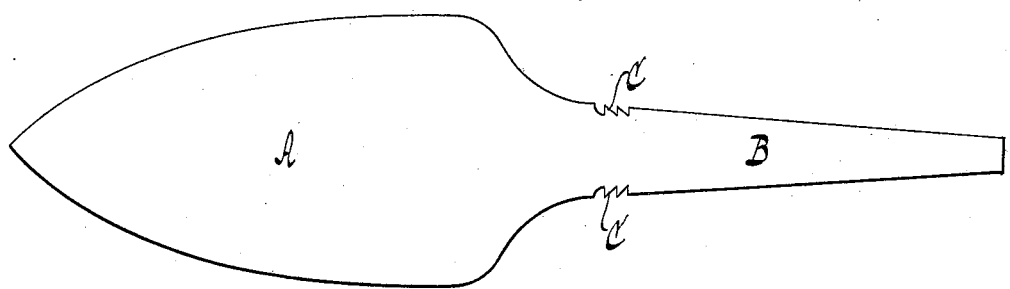
Figure 4:

Figure 1 is a plan view of a trowel stem and washer, the washer being in section. Fig. 2 is a side elevation, partly in section, of a trowel. Fig. 3 is a plan view of a blank which can be used to form the trowel. Fig. 4 is a detail view of a washer.

Similar letters indicate corresponding parts.

The letter A indicates the blade of a trowel, which may be of any suitable form, and B is the stem or shank of the trowel. The stem or shank is provided with spurs, lugs, or projections C, which spurs or projections, when the stem is inserted into the handle D, grip or catch onto the material of the handle. The handle and trowel will thus be held firmly together; also, to secure the shank B in the handle, the shank may be passed entirely through the handle and be provided at the free end of the shank with an attaching device to prevent the shank being pulled out of the handle. Convenient means of attachment are shown in the drawings, where a washer, E, is caused to set over or about the free end of the shank B, and the shank is then riveted or clinched over the washer. The form of the shank B before being clinched is shown in Fig. 1. The washer E is made of suitable material, such as metal.

A convenient way of making the trowel is to stamp or form the blank, Fig. 3, of any suitable material, such as metal. By means of suitable dies or apparatus the blank can be brought or shaped into suitable form—such, for example, as illustrated in Figs. 1 and 2.

The handle D may be made of any suitable material—such, for example, as wood.

As the blank can be readily stamped or formed and brought into the desired shape, and as the spurs or lugs C will securely hold the trowel and handle together, such trowels can be readily manufactured, and when completed such trowel will be durable and not liable to break or become inoperative. This method of manufacture may be applied to trowels, scoops, and articles of a similar kind.

The washer E may be fastened to the shank by a screw-thread; but the method of clinching the shank over the washer is preferable, as the end of the shank can thus be made to set smoothly onto the washer.

What I claim as new, and desire to secure by Letters Patent, is—

1. The blade A, having the tubular shank B, provided with outwardly-projecting spurs C, in combination with the handle D, arranged on the tubular shank and engaging the said spurs, substantially as described.

2. The combination of the blade A, formed integral with the stem B, having the edge spurs, C, and folded longitudinally into the form of a tube, with the handle D, arranged on the stem and engaging the spurs, with the extremity of the stem extending beyond the outer end of the handle, and the washer E, secured to said extremity of the tubular stem, substantially as described.

3. The blade A, formed integral with a stem, B, having its two opposite edges provided with lateral spurs C, and folded longitudinally into tubular form, in combination with the handle D, arranged on the tubular stem and engaging the spurs on the two edges thereof, substantially as described.

In testimony whereof I have hereunto set my hand and seal in the presence of two subscribing witnesses.

ALFRED BARDELL. [L. S.]

Witnesses:
 W. HAUFF,
 WILLIAM MILLER.